UNITED STATES PATENT OFFICE 2,372,244

ESTERS OF ACIDS OF PHOSPHORUS

Chester E. Adams, Highland, and Bernard H. Shoemaker, Hammond, Ind., assignors to Standard Oil Company, Chicago, Ill., a corporation of Indiana No Drawing. Application September 24, 1941, Serial No. 412,146

12 Claims. (Cl. 260—461)

The present invention relates to new and useful compounds of the type formed by reacting phosphorous acid or phosphoric acid with an olefin oxide or the sulfur or imino analogs of olefin oxides.

An object of the present invention is to provide new chemical compounds of the type mentioned above.

Another object of this invention is to provide methods for preparing such new chemical compounds.

A further object is to prepare certain compounds which we believe to be analogs of the alkylene glycol substituted partial esters of the acids of phosphorus. Additional objects and advantages will become apparent as the description proceeds.

Compounds according to the present invention probably have the formula:

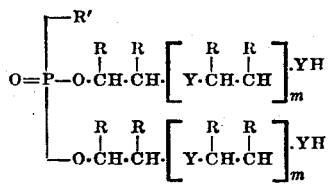

wherein R' represents a constituent selected from the group consisting of hydrogen and

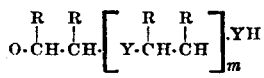

wherein R represents a constituent selected from the group consisting of hydrogen, alkyl, aryl, alkaryl, aralkyl and cyclic alkyl radicals; wherein Y represents a constituent selected from the group consisting of oxygen, sulfur and NH and wherein $m$ represents zero or a whole number.

Broadly, products of this type can be prepared by reacting an acid of phosphorus such as phosphorous acid or phosphoric acid with an organic ring compound having the formula:

wherein R represents a constituent selected from the group consisting of hydrogen, alkyl, aryl, alkaryl, aralkyl and cyclic alkyl radicals and wherein Y represents a constituent selected from the group consisting of oxygen, sulfur and NH.

As an example of the foregoing, dipropylene glycol, di substituted partial esters of phosphorous acid can be prepared by reacting phosphorous acid with a sufficient amount of propylene oxide. The reaction is believed to proceed as follows:

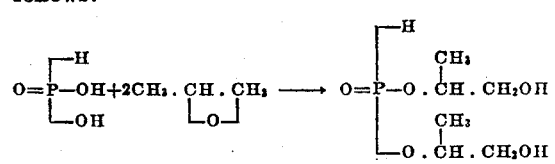

This intermediate product reacts in a similar manner with 2 more mols of propylene oxide to form

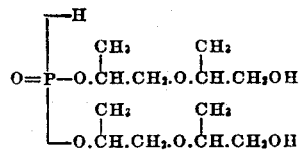

In place of propylene oxide other alkylene oxides can be used such as ethylene oxide, butylene oxides and the like or the alkylene sulfides or imines.

If ethylene imine is used instead of propylene oxide the product would probably be:

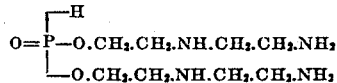

Analogously, if phosphoric acid is reacted with butylene sulfide the product would be:

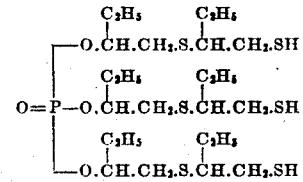

The reaction product of an acid of phosphorus and an olefin oxide is a water-white substantially oil insoluble compound which can be used as an intermediate to make an additive for lubricating oils. To improve its oil solubility so that it can be used as an effective sludge and varnish inhibitor in lubricating oils, the compound is treated with a chlorinating or sulfurizing agent such as $Cl_2$, $PCl_3$, S, $P_2S_3$ or $P_2S_5$. This treatment causes a replacement of the hydroxyl group with sulfur or halogen. The products can be added to oils as sludge and varnish inhibitors in quantities ranging from about 0.1% to about 3.0%.

The following examples will serve to illustrate the present invention:

*Example I*

38 grams (0.65 mol) of propylene oxide were added slowly with stirring to 5 grams (0.051 mol) of $H_3PO_4$ at a temperature of 75° F. to 95° F. The reaction was exothermic and the reaction flask was cooled from time to time to prevent the temperature of the reaction mixture from rising above 95° F., the boiling point of propylene oxide. After all of the propylene oxide had been added the reaction flask was placed on a hot water bath (temperature 170° F.) and the unreacted propylene oxide removed by bubbling nitrogen gas through the product until no further decrease in weight was noted. The residue was a water white viscous oil, soluble in water but insoluble in hexane. The weight of the reaction product was 23 grams. The reaction ratio was 1 mol of $H_3PO_4$ to 6 mols of propylene oxide.

The product is believed to be dipropylene glycol, tri substituted partial ester of phosphoric acid having the formula:

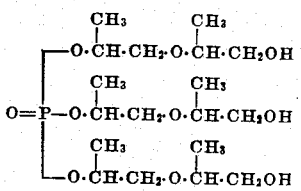

*Example II*

86 grams (1.48 mols) of propylene oxide were added slowly with stirring to 10 grams (0.124 mol) of $H_3PO_3$. Since a large amount of heat was liberated it was found necessary to cool the reaction mixture by means of a water bath to maintain the temperature in the range of 75° F. to 95° F. When the addition of the propylene oxide was completed, the reaction flask was placed in a hot water bath (170° F.) and nitrogen bubbled through the product to remove the unchanged propylene oxide. The residue was a water white oil, soluble in water and insoluble in hexane. The weight of the reaction product was 43 grams. The reaction ratio was 1 mol of $H_3PO_3$ to 4–5 mols of propylene oxide.

The product is believed to be dipropylene glycol, di substituted partial ester of phosphorous acid having the formula:

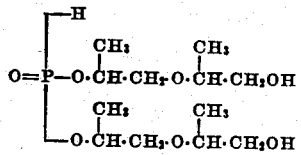

*Example III*

1 mol of phosphorous acid and 2 mols of ethylene oxide are reacted together at a temperature of 85° F. When the reaction is complete the product is subjected to distillation to remove any excess oxide which may be present. The product is believed to be mono ethylene glycol di substituted partial ester of phosphorous acid having the formula:

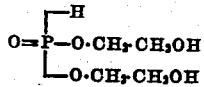

*Example IV*

From 6 to 12 mols of butylene imine are slowly added to 1 mol of phosphoric acid in the manner described above. (Example II). The product is believed to have the formula:

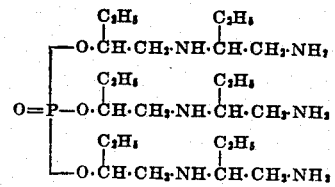

*Example V*

The product of reacting about 1 mol of phosphoric acid with about 3 mols of propylene imine, as described above probably has the formula:

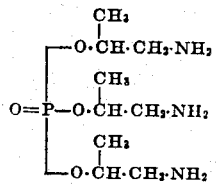

While the above reactions of the phosphorous acids with olefin oxides were carried out at temperatures within the range of 75° F. and 95° F. and at atmospheric pressure we do not wish to be limited to the operating conditions given in the above examples. The reactions of the olefin oxides or their sulfur analogs or their nitrogen analogs with the phosphorous acids can be carried out at temperatures within the range of 0° F. and 300° F. and at sufficient pressure to maintain the reactants in the liquid phase.

It is apparent that various modifications of the foregoing examples, which are merely illustrative, may be devised without departing from the spirit of the invention.

The scope of the present invention is defined by the claims appended hereto and not by the examples given herewith.

We claim:

1. The esters of acids of phosphorus having the formula

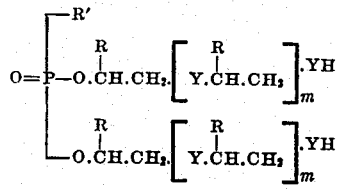

wherein R' represents a constituent selected from the group consisting of hydrogen and

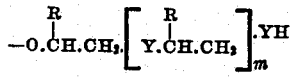

wherein R represents a constituent selected from the group consisting of hydrogen and an alkyl radical; wherein Y represents a constituent selected from the group consisting of oxygen and sulphur; and wherein $m$ is an integer selected from the group consisting of a whole number and zero.

2. The esters of phosphorous acid having the formula

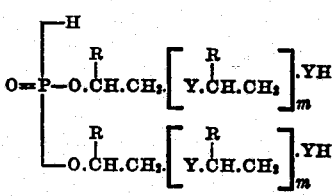

wherein R represents a constituent selected from the group consisting of hydrogen and an alkyl radical; wherein Y represents a constituent selected from the group consisting of oxygen and sulphur; and wherein $m$ is an integer selected from the group consisting of a whole number and zero.

3. The esters of phosphoric acid having the formula

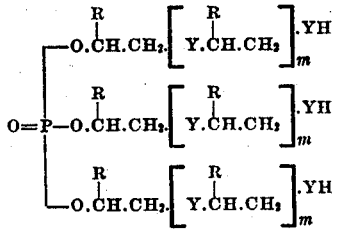

wherein R represents a constituent selected from the group consisting of hydrogen and an alkyl radical; wherein Y represents a constituent selected from the group consisting of oxygen and sulphur; and wherein $m$ is an integer selected from the group consisting of a whole number and zero.

4. A process for preparing an ester of an acid of phosphorus comprising reacting an acid of phosphorus with a compound having the formula

wherein R represents a constituent selected from the group consisting of hydrogen and alkyl radicals and wherein Y represents a constituent selected from the group consisting of oxygen and sulphur at a temperature of from about 0° F. to about 300° F. the mol ratio of the compound to the acid of phosphorus being at least 2:1.

5. A process for preparing an ester of phosphoric acid comprising reacting phosphoric acid with a compound having the formula

wherein R represents a constituent selected from the group consisting of hydrogen and alkyl radicals and wherein Y represents a constituent selected from the group consisting of oxygen and sulphur at a temperature of from about 0° F. to about 300° F. the mol ratio of the compound to the phosphoric acid being at least 2:1.

6. A process for preparing an ester of phosphorous acid comprising reacting phosphorous acid with a compound having the formula

wherein R represents a constituent selected from the group consisting of hydrogen and alkyl radicals and wherein Y represents a constituent selected from the group consisting of oxygen and sulphur at a temperature of from about 0° F. to about 300° F. the mol ratio of the compound to the phosphorous acid being at least 2:1.

7. The ester of phosphoric acid having the formula:

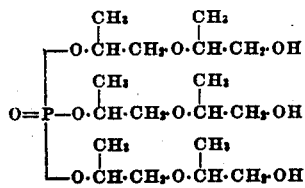

8. The ester of phosphorous acid having the formula:

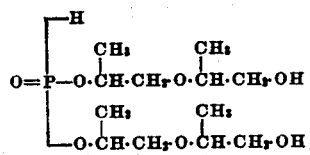

9. A process as claimed in claim 5 wherein the mol ratio of the acid of phosphorus to the other reactant is from 1 to 2 to about 1 to 12.

10. A process for preparing an ester of an acid of phosphorus comprising reacting an acid of phosphorus with propylene oxide.

11. A process for preparing an ester of an acid of phosphorus comprising reacting an acid of phosphorus with ethylene oxide.

12. A process for preparing an ester of an acid of phosphorus comprising reacting an acid of phosphorus with butylene oxide.

CHESTER E. ADAMS.
BERNARD H. SHOEMAKER.